United States Patent
Tonietto et al.

(10) Patent No.: US 11,029,037 B2
(45) Date of Patent: Jun. 8, 2021

(54) RUBBER FOOT FOR A HEATABLE METAL DEVICE

(71) Applicant: Electrolux Appliances Aktiebolag, Stockholm (SE)

(72) Inventors: Stefano Tonietto, Forli (IT); Emanuele Sorrentino, Forli (IT)

(73) Assignee: Electrolux Appliances Aktiebolag, Stockholm (SE)

( * ) Notice: Subject to any disclaimer, the term of this patent is extended or adjusted under 35 U.S.C. 154(b) by 647 days.

(21) Appl. No.: 15/553,234

(22) PCT Filed: Feb. 4, 2016

(86) PCT No.: PCT/EP2016/052337
§ 371 (c)(1),
(2) Date: Aug. 24, 2017

(87) PCT Pub. No.: WO2016/134939
PCT Pub. Date: Sep. 1, 2016

(65) Prior Publication Data
US 2018/0038598 A1 Feb. 8, 2018

(30) Foreign Application Priority Data
Feb. 25, 2015 (EP) .................................... 15156444

(51) Int. Cl.
*F24C 15/10* (2006.01)
*F16L 59/02* (2006.01)
*A47B 91/06* (2006.01)

(52) U.S. Cl.
CPC ............ *F24C 15/107* (2013.01); *A47B 91/06* (2013.01); *F16L 59/02* (2013.01)

(58) Field of Classification Search
CPC ................................ F24C 15/107; F16L 59/02
See application file for complete search history.

(56) References Cited

U.S. PATENT DOCUMENTS

170,190 A * 11/1875 Pratt .................... A47B 95/043
248/345.1
3,494,244 A * 2/1970 Wayland ................ A47B 17/00
411/510
(Continued)

FOREIGN PATENT DOCUMENTS

DE       20302695 U1    5/2003
DE    202010010785 U1   11/2010
(Continued)

OTHER PUBLICATIONS

"Bluesil MM 60 THT—High Heat Stability" dated Jun. 2012, 6 pages.
(Continued)

*Primary Examiner* — Anita M King
(74) *Attorney, Agent, or Firm* — Pearne & Gordon LLP

(57) ABSTRACT

Provided is a rubber foot for a heatable or heated metal device, such as a cast iron grid of a cooking hob. The rubber foot includes a shaft forming an upper part of said rubber foot and having a symmetry axis. The shaft has a cylindrical body for inserting into a hole in the bottom of the metal device along the symmetry axis. The rubber foot includes a head forming a lower part of said rubber foot and being provided for a position below the hole in the bottom of the metal device. The rubber foot includes at least one wing enclosing at least partially the cylindrical body and formed by at least one ring enclosing the cylindrical body which can be subdivided by at least one recess. The rubber foot with the shaft, head and at least one wing is formed as a single-piece part.

22 Claims, 2 Drawing Sheets

(56) References Cited

U.S. PATENT DOCUMENTS

Figure 1:
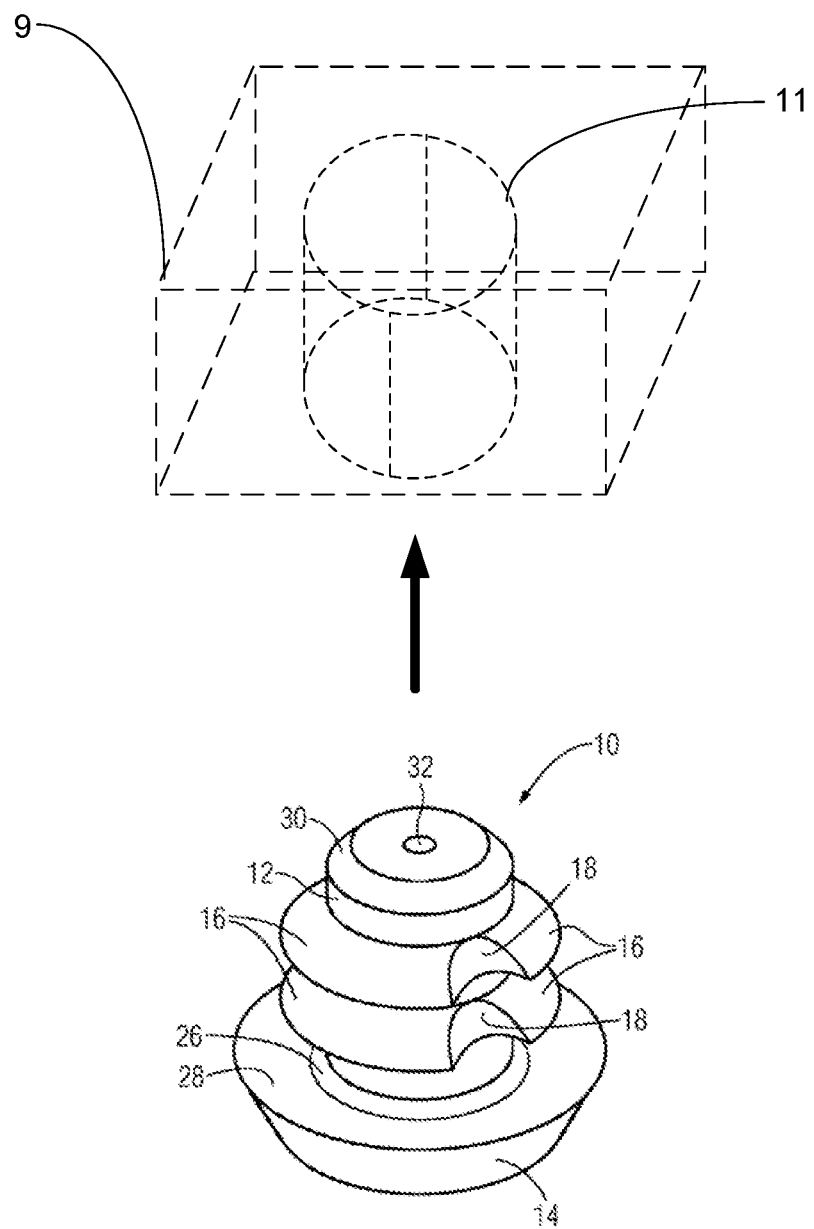

| | | | | |
|---|---|---|---|---|
| 3,575,288 | A * | 4/1971 | Brucken | A47B 91/024 206/320 |
| 3,678,797 | A * | 7/1972 | Seckerson | F16B 21/086 411/509 |
| 4,718,631 | A * | 1/1988 | Reynolds | F16F 3/093 206/320 |
| 4,728,238 | A | 3/1988 | Chisholm | |
| 5,007,607 | A * | 4/1991 | Kim | A47B 81/06 248/188.9 |
| 5,169,115 | A * | 12/1992 | Chung Hsiang | A47B 91/04 16/30 |
| 5,540,528 | A * | 7/1996 | Schmidt | F16B 19/1081 24/297 |
| 5,921,510 | A * | 7/1999 | Benoit | F16L 3/2334 248/68.1 |
| 6,357,717 | B1 * | 3/2002 | Kennard, IV | F16F 1/44 248/562 |
| 6,612,795 | B2 * | 9/2003 | Kirchen | F16B 21/02 24/297 |
| 7,503,528 | B2 * | 3/2009 | Adams | F16B 5/0685 24/297 |
| 8,459,920 | B2 * | 6/2013 | Selle | F16B 5/0628 24/453 |
| 8,479,899 | B2 * | 7/2013 | Ohtake | F16F 1/371 188/129 |
| 9,612,021 | B2 * | 4/2017 | Wood | F24C 15/107 |
| 2008/0086845 | A1 | 4/2008 | Gianandrea | |
| 2009/0044795 | A1 | 2/2009 | Shaffer | |
| 2012/0048258 | A1 * | 3/2012 | Sewell | F24C 15/107 126/152 A |
| 2013/0088819 | A1 * | 4/2013 | Dernier | H05K 5/0204 361/679.01 |
| 2017/0059178 | A1 * | 3/2017 | Lando | F24C 15/107 |

FOREIGN PATENT DOCUMENTS

| | | |
|---|---|---|
| GB | 1911-09734 A | 9/1911 |
| WO | 2004023043 A1 | 3/2004 |

OTHER PUBLICATIONS

International Search Report and Written Opinion from PCT/EP2016/052337; dated Apr. 1, 2016; 10 pages.

"Bluesil HCR 60 THT" dated Jul. 1999, downloaded from Internet at https://silicones.elkem.com/EN/our_offer/Product/90058541/_/BLUESIL-HCR-60-THT on Aug. 23, 2017, 3 pages. [note the website identified in the ISR/WO for this reference is no longer active, but it is believed this is the document referenced].

Notice to Grant for application No. 15156444.0 dated Sep. 6, 2017, 16 pages.

* cited by examiner

RUBBER FOOT FOR A HEATABLE METAL DEVICE

FIELD OF INVENTION

The present invention relates to a rubber foot for a heatable or heated metal device, in particular for a cast iron grid of a cooking hob. Further, the present invention relates to a heatable metal device with at least one hole in its bottom. Moreover, the present invention relates to a cast iron grid for a cooking hob. For example, the cast iron grid is provided as a pot support or pan support for a gas cooking hob. Additionally, the present invention relates to the use of a silicone type for a rubber foot.

BACKGROUND

Some kinds of metal grids, in particular a cast iron grid for a gas cooking hob, are used as pot support or pan support. Some rubber feet are attached at the bottom side of the metal grid or cast iron grid in order to avoid the direct contact between the grid and a panel of the cooking hob. The rubber feet separate thermally the grid from the panel and avoid that thermal shocks destroy the panel.

Conventional rubber feet are made of silicone and glued on the grid. However, the gluing of the rubber feet onto the grid is laborious. It is desired to have rubber feet fixable onto the grid by an easy way.

SUMMARY

It is an object of the present invention to provide a rubber foot suitable for a heatable or heated metal device, which rubber foot is fixable onto the metal device by low complexity.

According to the present invention a rubber foot is provided for a heatable or heated metal device, in particular for a cast iron grid of a cooking hob, wherein
- the rubber foot includes a shaft forming an upper part of said rubber foot,
- the shaft includes a cylindrical body and is provided for inserting into a hole in the bottom of the metal device along the symmetry axis of said cylindrical body,
- the rubber foot includes a head forming a lower part of said rubber foot,
- the head is provided for a position below the hole in the bottom of the metal device, when the shaft is inserted in said hole,
- the diameter of the head is bigger than the diameter of the shaft,
- the rubber foot includes at least one wing enclosing at least partially the cylindrical body of the shaft,
- the at least one wing is formed by at least one ring enclosing the cylindrical body of the shaft and/or the at least one wing is formed by at least one ring enclosing the cylindrical body of the shaft and subdivided by at least one recess, and
- the rubber foot with the shaft, the head and the wings is formed as a single-piece part.

The main idea of the present invention is the shape of the rubber foot. In particular, the at least one wing allows that the shaft is stably inserted into the hole in the bottom of the metal device, wherein no glue is required.

Preferably, the recess forms a lateral evacuation channel. The lateral evacuation channel avoids that an isolated chamber is formed upon the shaft, when said shaft is inserted in the hole.

In particular, the wings have a triangular cross-section, wherein an upper surface of the wings is inclined more strongly than a lower surface of the wings.

For example, the upper surface of the wings is inclined between 30 degrees and 60 degrees, preferable 45 degrees.

Further, the lower surface of the wings may be horizontal or inclined up to 20 degrees.

According to a preferred embodiment the rubber foot includes at least two pairs of wings arranged on top of each other.

Preferably, the recesses of the rings are arranged along common axes parallel to the symmetry axis of the cylindrical body of the shaft, so neighboured recesses of the rings form the lateral evacuation channel.

Furthermore, an upper side of the head is concave.

In this case, the upper side of the head may include an inner curvature and an outer curvature, wherein the inner curvature has a smaller radius of curvature than the outer curvature.

In particular, the rubber foot is made of silicone, preferably of the type BlueStar Silicones Bluesil™ HCR 60 THT or Wacker ELASTOSIL® R 750/50. Alternatively, the rubber foot may be made of general type of silicone.

Further, the present invention relates to a heatable metal device with at least one hole in its bottom side, wherein the metal device comprises at least one rubber foot inserted or insertable into the at least one hole in the bottom side of said metal device.

Moreover, the present invention relates to a cast iron grid for a cooking hob, wherein said cast iron grid comprises at least one hole in its bottom side, wherein the cast iron grid comprises at least one rubber foot inserted or insertable into the at least one hole in the bottom side of said cast iron grid.

Additionally, the present invention relates to the use of silicone of the type BlueStar Silicones Bluesil™ HCR 60 THT or Wacker ELASTOSIL® R 750/50 for a rubber foot for a heatable or heated metal device.

In particular, the silicone of the type BlueStar Silicones Bluesil™ HCR 60 THT or Wacker ELASTOSIL® R 750/50 is used for a rubber foot mentioned above.

Novel and inventive features of the present invention are set forth in the appended claims.

The present invention will be described in further detail with reference to the drawing, in which

DRAWINGS

Figure 2:
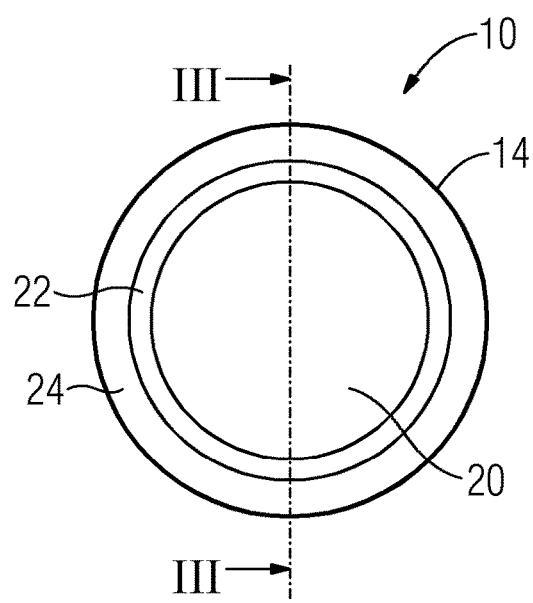
Figure 3:
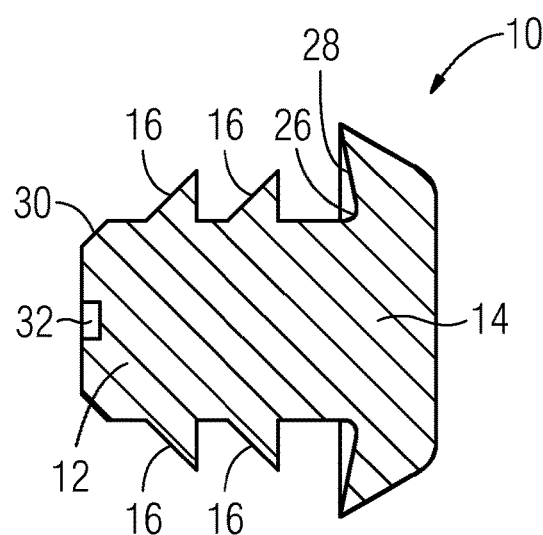
Figure 4:
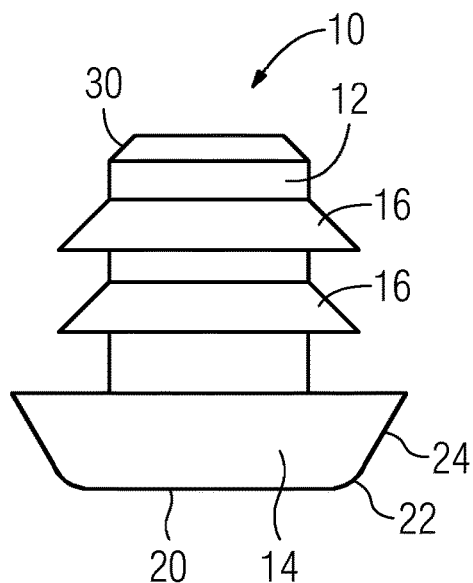
Figure 5:
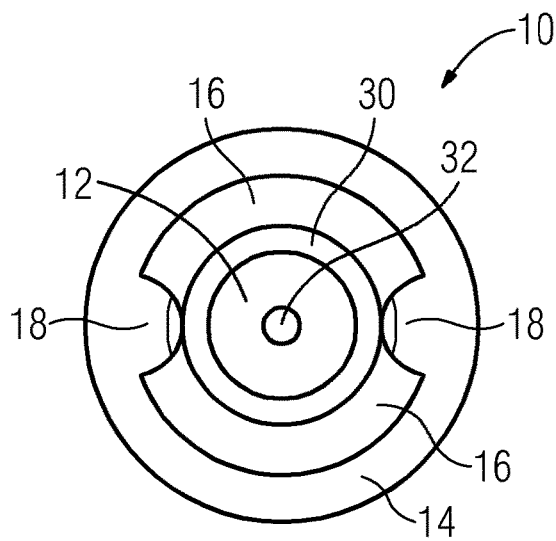

FIG. 1 illustrates a perspective view of a rubber foot according to a preferred embodiment of the present invention, the rubber foot being illustrated relative to a generic metal device for receiving the rubber foot, FIG. 2 illustrates a bottom view of the rubber foot according to the preferred embodiment of the present invention, FIG. 3 illustrates a sectional view of the rubber foot according to the preferred embodiment of the present invention, FIG. 4 illustrates a side view of the rubber foot according to the preferred embodiment of the present invention, and FIG. 5 illustrates a top view of the rubber foot according to the preferred embodiment of the present invention.

DETAILED DESCRIPTION

FIG. 1 illustrates a perspective view of a rubber foot 10 according to a preferred embodiment of the present invention. In FIG. 1 the rubber foot 10 is oriented in the same way, when said rubber foot 10 is in use. Items like "upper" and "lower" relate to this orientation, when the rubber foot 10 is in use.

The rubber foot 10 includes a shaft 12 and a head 14. The shaft 12 is substantially cylindrical. The head 14 is arranged at the lower face side of the shaft 12. In this example, the head 14 is formed like a mushroom head, so that the rubber foot 10 is substantially shaped as an upside-down mushroom.

Further, the rubber foot 10 includes two pairs of wings 16. The wings 16 are arranged at the lateral surface of the shaft 12. Each pair of wings 16 is formed as a ring enclosing the lateral surface of the shaft 12, wherein said ring is interrupted by two recesses 18. In this example, the recesses 18 are arranged at opposite sides of the lateral surface of the shaft 12 and the wings 16 of each pair are symmetric. In general, the ring may be interrupted by an arbitrary number of recesses 18, so that said ring is subdivided into a corresponding number of wings 16.

The recesses 18 are positioned in such a way, that two neighboured recesses 18 of different rings form a channel extending parallel to the longitudinal axis of the shaft 12 in each case. In this example, two parallel channels are formed at opposite sides of the shaft 12. The channels are provided as lateral evacuation channels.

The upper side of the head 14 includes an inner curvature 26 and an outer curvature 28. The inner curvature 26 and the outer curvature 28 are both concave. The inner curvature 26 is strongly curved, while the outer curvature 28 is weakly curved. These curvatures 26, 28 intersect at a discrete annular vertex of the concave upper side 14, providing at the intersection thereof an annular depression therebetween. The inner curvature 26 forms the intermediate portion between the lateral surface of the shaft 12 and the outer curvature 28.

Furthermore, the shaft 12 includes a bevel 30 between its lateral surface and its upper face side. A central recess 32 is formed in the centre of said upper face side.

Moreover, the rubber foot 10 may include an arbitrary number of pairs of wings 16. The shaft 12, the head 14 and the two pairs of wings 16 are formed as a single-piece part. In FIG. 1 the rubber foot 10 is aligned such as when said rubber foot 10 is in use, i.e. the shaft 12 forms the upper art, while the head 14 forms the lower part of the rubber foot 10.

FIG. 2 illustrates a bottom view of the rubber foot 10 according to the preferred embodiment of the present invention. The lower side of the head 14 of the rubber foot 10 includes a central plane surface 20, an intermediate curved surface 22 and an outer surface 24. In this example, the diameter of the head 14 of the rubber foot is 12 mm.

FIG. 3 illustrates a sectional view of the rubber foot 10 according to the preferred embodiment of the present invention. In FIG. 3 the upper part of the rubber foot 10, i.e. the shaft 12, is shown on the left hand side, while the lower part of the rubber foot 10, i.e. the head 14, is shown on the right hand side.

The wings 16 have a triangular cross-section enclosing the shaft 12. An upper surface of each wing 16 is inclined by 45 degrees. A lower surface of each wing 16 is horizontal.

In this example, the inner curvature 26 on the upper side of the head 14 has a radius of curvature of 0.5 mm, while the outer curvature 28 on the upper side of the head 14 has a radius of curvature of 8 mm.

In this embodiment, the distance between the outer edges of both wings 16 is 2.5 mm. Further, the distance between the outer edge of the upper wing 16 and the upper face side of the shaft 12 is 3.5 mm. Moreover, the distance between the outer edge of the lower wing 16 and the outer edge of the head 14 is 2 mm.

FIG. 4 illustrates a side view of the rubber foot 10 according to the preferred embodiment of the present invention.

In this embodiment, the shaft 12 has a diameter of 6 mm. Further, the head 14 is a height of 3 mm, while the rubber foot 10 has a height of 11 mm.

FIG. 5 illustrates a top view of the rubber foot 10 according to the preferred embodiment of the present invention. In this embodiment, the wings 16 have a wing-spread of 9 mm. Further, the recesses 18 have a radius of curvature of 1.5 mm.

The rubber foot 10 is provided as a supporting element for a cast iron grid of a cooking hob, in particular a gas cooking hob. In general, the rubber foot 10 is provided as a supporting element for a heated or heatable metal device 9. The rubber foot 10 is inserted or insertable into a blind hole 11 at the bottom of the cast iron grid or at the bottom of a foot of said cast iron grid. For example, the cast iron grid is used as a pot holder on a gas cooking hob with a glass panel. The diameter of the blind hole is marginally bigger than the diameter of the shaft 12 of the rubber foot 10.

The bevel 30 and the inclined upper surfaces of the wings 16 allow an easy inserting of the rubber foot 10 into the blind hole. Further, the shape of the wings 16 prevents a self-acting disconnection of the rubber foot 10 from the blind hole and guarantees the fixation of the rubber foot 10 in said blind hole. Glue is not necessary for fixing the rubber foot 10 in the blind hole.

The lateral evacuation channels formed by the recesses 18 avoid that an isolated chamber is formed within the blind hole. In the isolated chamber high pressure may occur. Said high pressure supports or causes the disconnection of the rubber foot 10 from the blind hole.

Preferably, the inner curvature 26 and/or outer curvature 28 at the upper side of the head 14 comprise at least partially a smooth surface. Said smooth surface makes it difficult to disconnect the rubber foot 10 from the blind hole.

The rubber foot 10 is formed as a single-piece part and made of silicon or a rubber like material. For example, the silicone of the type BlueStar Silicones Bluesil™ HCR 60 THT or Wacker ELASTOSIL® R 750/50 is used for the rubber foot 10.

Although an illustrative embodiment of the present invention has been described herein with reference to the accompanying drawing, it is to be understood that the present invention is not limited to that precise embodiment, and that various other changes and modifications may be affected therein by one skilled in the art without departing from the scope or spirit of the invention. All such changes and modifications are intended to be included within the scope of the invention as defined by the appended claims.

LIST OF REFERENCE NUMERALS 10 rubber foot
12 shaft
14 head
16 wing
18 recess
30 plane central surface
22 curved intermediate surface
24 outer surface
26 inner curvature
28 outer curvature 30 bevel
32 central recess

The invention claimed is:

1. A rubber foot for a heatable or heated metal device, the rubber foot comprising:
    a shaft forming an upper part of said rubber foot, the shaft including a cylindrical body and being provided for inserting into a hole in a bottom of the metal device along a symmetry axis of said cylindrical body,
    a head forming a lower part of said rubber foot, the head being provided for a position below the hole in the bottom of the metal device when the shaft is inserted in said hole, the head having a diameter bigger than a diameter of the shaft, and
    at least one wing enclosing at least partially the cylindrical body of the shaft, the at least one wing formed by at least one ring enclosing the cylindrical body of the shaft or the at least one wing formed by at least one ring enclosing the cylindrical body of the shaft and subdivided by at least one recess,
    wherein the rubber foot, with the shaft, the head and the at least one wing, is formed as a single-piece part,
    wherein an upper side of the head from which the shaft extends is concave and includes an inner curvature and an outer curvature, and
    wherein the inner curvature has a smaller radius of curvature than the outer curvature.

2. The rubber foot according to claim 1, wherein the recess forms a lateral evacuation channel.

3. The rubber foot according to claim 1, wherein the at least one wing has a triangular cross-section, wherein an upper surface of the at least one wing is inclined more strongly than a lower surface thereof.

4. The rubber foot according to claim 3, wherein the upper surface of the at least one wing is inclined between 30 degrees and 60 degrees.

5. The rubber foot according to claim 4, said upper surface being inclined 45 degrees.

6. The rubber foot according to claim 3, wherein the lower surface of the at least one wing is horizontal or inclined up to 20 degrees.

7. The rubber foot according to claim 1 wherein the rubber foot includes at least two pairs of wings arranged on top of each other.

8. The rubber foot according to claim 7, wherein the recesses of the rings are arranged along common axes parallel to the symmetry axis of the cylindrical body of the shaft, so neighboured recesses of the rings form a lateral evacuation channel.

9. The rubber foot according to claim 1, wherein the rubber foot is made of silicone.

10. A cast iron grid for a cooking hob, wherein said cast iron grid comprises at least one hole in its bottom side, wherein the cast iron grid comprises at least one rubber foot according to claim 1 inserted or insertable into the at least one hole in the bottom side of said cast iron grid.

11. The rubber foot according to claim 1, said metal device being a cast iron grid of a cooking hob.

12. The rubber foot according to claim 1, wherein the inner and outer curvatures intersect at a discrete annular vertex of the concave upper side.

13. The rubber foot according to claim 1, wherein the inner curvature and the outer curvature each are constant curvatures intersecting at an annular depression therebetween, the depression being non-rounded along a radial direction.

14. The rubber foot according to claim 1, wherein each of the inner curvature and the outer curvature are concave.

15. A heatable metal device with at least one hole in its bottom side, wherein the metal device comprises at least one rubber foot inserted or insertable into the at least one hole in the bottom side of said metal device, wherein an upper side of the rubber foot facing toward the bottom side of said metal device is concave and includes an inner curvature and an outer curvature, wherein the inner curvature has a smaller radius of curvature than the outer curvature, and wherein each of the inner curvature and the outer curvature are concave.

16. The heatable metal device according to claim 15, wherein the inner and outer curvatures intersect at a discrete annular vertex of the concave upper side.

17. A rubber foot for supporting a heatable metal device, said rubber foot comprising:
    a head having a concave upper side, a cylindrical shaft extending upward from said upper side of the head, and a first ring extending circumferentially about said shaft and being interrupted by at least one recess arranged in said first ring, said at least one recess defining an evacuation channel that permits air to pass as the rubber foot is inserted into a hole in an underside surface of said heatable metal device in order to ease insertion therein, wherein the concave upper side includes an inner curvature and an outer curvature, and wherein the inner curvature has a smaller radius of curvature than the outer curvature.

18. The rubber foot according to claim 17, said at least one recess comprising a first plurality of recesses in said first ring, said first ring thereby defining a corresponding plurality of first wings extending laterally from said shaft.

19. The rubber foot according to claim 18, further comprising a second ring extending circumferentially about said shaft and spaced longitudinally from said first ring, said second ring comprising a second plurality of recesses therein, equal in number to and aligned with said first plurality of recesses in said first ring to thereby define a corresponding plurality of second wings of said second ring, wherein said pluralities of first and second wings have triangular cross-sections with respective upper surfaces thereof angled at between 20 and 60 degrees relative to a longitudinal axis of said shaft.

20. A cooking hob comprising a cast iron grid having a hole in a bottom surface thereof, and the rubber foot according to claim 19 inserted therein.

21. The rubber foot according to claim 17, wherein the inner curvature and the outer curvature each are constant curvatures intersecting at an annular depression therebetween, the depression being non-rounded along a radial direction.

22. The rubber foot according to claim 17, wherein each of the inner curvature and the outer curvature are concave.

* * * * *